(12) United States Patent
Mousavi et al.

(10) Patent No.: US 8,390,302 B2
(45) Date of Patent: Mar. 5, 2013

(54) APPARATUS AND METHOD FOR ADAPTIVE FAULT DETECTION IN MV DISTRIBUTION CIRCUITS

(75) Inventors: Mirrasoul J. Mousavi, Cary, NC (US);
John J. McGowan, Allentown, PA (US);
James Stoupis, Durham, NC (US);
Vaibhav D. Donde, Raleigh, NC (US)

(73) Assignee: ABB Research Ltd, Zurich (CH)

( * ) Notice: Subject to any disclaimer, the term of this patent is extended or adjusted under 35 U.S.C. 154(b) by 602 days.

(21) Appl. No.: 12/554,614

(22) Filed: Sep. 4, 2009

(65) Prior Publication Data

US 2010/0066381 A1 Mar. 18, 2010

Related U.S. Application Data

(60) Provisional application No. 61/095,170, filed on Sep. 8, 2008.

(51) Int. Cl.
*G01R 31/02* (2006.01)
*H04B 3/46* (2006.01)
(52) U.S. Cl. ........................................... 324/539
(58) Field of Classification Search .......... 324/500, 324/539, 543; 361/62–87, 93.1, 93.2, 94, 361/97
See application file for complete search history.

(56) References Cited

U.S. PATENT DOCUMENTS

| | | | |
|---|---|---|---|
| 5,029,039 A * | 7/1991 | Yeh | ................................. 361/59 |
| 5,768,079 A | 6/1998 | Buell | |
| 6,144,721 A | 11/2000 | Stephens | |
| 6,198,401 B1 * | 3/2001 | Newton et al. | ................. 340/635 |
| 6,798,211 B1 | 9/2004 | Rockwell et al. | |
| 2002/0131222 A1 * | 9/2002 | McClure et al. | ................. 361/71 |
| 2008/0100307 A1 * | 5/2008 | Stoupis et al. | ................. 324/539 |

FOREIGN PATENT DOCUMENTS

| | | |
|---|---|---|
| WO | 2008103342 A1 | 8/2008 |
| WO | PCT/US2007/022543 | 6/2009 |
| WO | 2010028286 A1 | 3/2010 |

OTHER PUBLICATIONS

Cheney et al., Distribution Single-Phase Tripping and Reclosing: Overcoming Obstacles With Programmable Recloser Controls, dated Sep. 17, 2008, available online at www2.selinc.com/techpprs/6334_DistributionSinglePhase_GH.*

Mirrasoul J. Mousavi and Karen L. Butler-Purry, "Temporal analysis of power system measurements for condition assessment purposes", IEEE Power Engineering Society General Meeting, Jun. 2007, pp. 1-8.

(Continued)

*Primary Examiner* — Melissa Koval
*Assistant Examiner* — Daniel Miller
(74) *Attorney, Agent, or Firm* — Paul R. Katterle

(57) ABSTRACT

A method and a protective device operable to perform the method are provided, wherein the method is for detecting and analyzing faults in a first cable and one or more other cables, which convey power in a three phase feeder system. Current magnitude in the first cable is compared to a threshold level. If the current magnitude exceeds the threshold level, the duration of the condition is measured. If the duration falls within a predetermined duration range, a predetermined time interval is allowed to pass and then a determination is made whether a fault is detected in the one or more other cables. If a fault is not detected in the one or more other cables, then a determination is made that a single phase fault has occurred in the feeder system.

15 Claims, 8 Drawing Sheets

OTHER PUBLICATIONS

C. J. Kim, "Identification of symptom parameters for failure anticipation by timed-event trend analysis", IEEE Power Engineering Review, vol. 20, No. 9, Sep. 2000, pp. 48-49.

C. J. Kim, Seung-Jae Lee and Sang-Hee Kang, "Evaluation of feeder monitoring parameters for incipient fault detection using Laplace trend statistic", IEEE Transactions on Industry Application, vol. 40, No. 6, Nov.-Dec. 2004, pp. 1718-1724.

Kirama Kanoun and Jean-Claude Laprie, "Software reliability trend analyses from theoretical to practical considerations", IEEE Transactions on Software Engineering, vol. 20, No. 9, Sep. 1994, pp. 740-747.

Olivier Gaudoin, "Optimal properties of the Laplace Trend Test for software-reliability models", IEEE Transaction on Reliability, vol. 41, No. 4, Dec. 1992, pp. 525-532.

C. J. Kim, J. H. Shin, M. Yoo and G. W. Lee, "A Study on the Characterization of the Incipient Failure Behavior of Insulators in Power Distribution Line", IEEE Transactions on Power Delivery, vol. 14, No. 2, Apr. 1999, pp. 519-524.

W. E. Anderson, J. D. Ramboz and A. R. Ondrejka, "The detection of incipient faults in transmission cables using time domain reflectometry techniques: Technical challenges", IEEE Transactions on Power Apparatus and Systems, vol. PAS-101, No. 7, Jul. 1982, pp. 1982-1934.

K. L. Butler, "An expert system based framework for an incipient failure detection and predictive maintenance system," in Proc. 1996 Intelligent System Application to Power Systems Conf., Jan. 1996, pp. 321-326.

S. M. Miri and A. Privette, "A survey of incipient fault detection and location techniques for extruded shielded power cables", presented at the 26th Annual Southeastern Symposium on System Theory, Athens, Oh, 1994, pp. 402-405.

H. E. Orton, "Diagnostic testing of in-situ power cables: an overview", IEEE/PES Transmission and Distribution Conference and Exhibition 2002: Asia Pacific Conference, Yokohama, Japan, Oct. 2002, vol. 2, pp. 1420-1425.

R. Moghe, M. J. Mousavi, J. Stoupis, and J. McGowan, "Field investigation and analysis of incipient faults leading to a catastrophic failure in an underground distribution feeder", in Proc. 2009 Power Systems Conference and Exposition, Mar. 2009.

J. Cardoso and K. L. Butler, "Field studies of incipient behavior in damaged underground cable," in Proc. 60th Annu. American Power Conf., vol. 60-I, Chicago, IL, Apr. 14-16, 1998, pp. 522-526.

Rohit Moghe and Mirrasoul Mousavi,"Trend analysis Techniques for Incipient Fault Prediction," The 2009 IEEE PES General Meeting Advanced Program of Technical Sessions and Committee Meetings., Seattle, WA. Jul. 30, 2009.

L. A. Kojovic and C. W. Williams, "Sub-cycle detection of incipient cable splice faults to prevent cable damage", in Proc. IEEE/PES Summer Meeting, Jul. 16-20, vol. 2, 2000, pp. 1175-1180.

\* cited by examiner

APPARATUS AND METHOD FOR ADAPTIVE FAULT DETECTION IN MV DISTRIBUTION CIRCUITS

CROSS REFERENCE TO RELATED APPLICATION

This application claims priority under 35 U.S.C. 119(e) from U.S. provisional patent application Ser. No. 61/095,170 filed on Sep. 8, 2008, entitled "Field Investigation and Analysis of Incipient Faults Leading to a Catastrophic Failure in an Underground Distribution Feeder" which is hereby incorporated by reference in its entirety.

BACKGROUND OF THE INVENTION

This invention relates to fault detection in electrical power distribution systems. It finds particular application to the detection and notification of subtle feeder faults in overhead and underground feeders that are not ordinarily detected by conventional feeder protection intelligent electronic device (IEDs).

Underground and overhead feeders and cables are a key component in the transmission and distribution of electrical power. Unfortunately, however, overhead feeders and cables can be prone to short circuits or otherwise abnormally low impedance connections between two or more phases or between one or more phases and ground. These and other feeder faults including cable faults can be caused by a number of factors, including human error (e.g., accidentally cutting or striking a cable), climatologic conditions (e.g., precipitation, seismic activity, or lightning strikes), animal activity, and failure or degradation of the cable or its associated equipment due to the aging of the insulation. Moreover, feeder faults including cable faults can lead to power outages, which are inconvenient for the affected customers and which can be expensive for the electric utility involved.

One category of feeder faults is that of self-clearing faults. While self-clearing faults can have any number of root causes, they typically have a temporal duration which is insufficient to trip the relevant protective device. In practice, the duration of most self-clearing faults is typically less than about one (1) to two (2) cycles of the power system frequency, and in many cases less than one (1) cycle.

One mechanism which can generate self-clearing cable faults is a temporary breakdown in the insulation between cable phases or between a cable phase and ground. Such faults are often caused or exacerbated by moisture at a cable splice or joint, and are typically characterized by an elevated or fault current having a duration of about one-quarter to one-half cycle (i.e., roughly four (4) to eight (8) milliseconds (ms) in a sixty Hertz (60 Hz) system). The onset of the fault current usually occurs at or near a voltage peak where the electric field stress is the highest. As the situation deteriorates, the frequency and severity of these faults tend to worsen with time, culminating in an eventual cable failure and a resultant power outage.

Detection apparatus has been developed to identify self-clearing faults. For example, see (i.) Kojovic, et al., Sub-Cycle Overcurrent Protection for Self-Clearing Faults Due to Insulation Breakdown (1999); and (ii.) U.S. Pat. No. 6,198,401 to Newton, et al., Detection of Sub-Cycle, Self-Clearing Faults, issued Mar. 6, 2001. In prior art fault detection devices such as those identified above, a transient fault is automatically determined to be a self-clearing fault of the type associated with cable degradation. However, the inventors have determined that such transient faults are not necessarily self-clearing faults attributable to cable degradation. In some instances, such transient faults may be attributable to arc propagation from another cable or from environmental or other factors that affect more than one cable.

Furthermore, in conventional devices, the user has to set the program settings manually and appropriately for the algorithm to work properly. Setting the parameters requires a-priori knowledge of the system parameters, load currents, as well as fault current levels. The issue may be resolved when the settings are entered for the first time but fault currents and circuit loadings are subject to change on a frequent basis due to manual or automated switching and reconfiguration of the circuits. When the circuit is reconfigured, the algorithm settings need to change accordingly to reflect the latest status of the circuit. Changing the parameters on-the-fly and automatically has not been a common practice to date. By making use of adaptive settings, the algorithm adapts dynamically to the changing environment and prepares itself for correct operation without user intervention.

Finally, conventional fault detection functions typically reside at the level of the protective relay with fixed implementation. One consequence of this relay-centric architecture is that the apparatus is relatively poorly integrated with the substation automation (SA), distribution automation (DA), feeder automation (FA), or other automation system. Moreover, the apparatus requires the use of a specialized hardware platform which must be closely coupled to the protective relay. Furthermore, the detection techniques have been relatively unsophisticated and make use of instantaneous fault currents. Although this minimizes the detection delay, without proper filtering, the techniques may be prone to noise and outliers resulting in nuisance false alarms.

The present invention is directed toward methods and apparatus that address the foregoing deficiencies of prior art fault detection methods and apparatus.

SUMMARY OF THE INVENTION

In accordance with the present invention, a computer-implemented method is provided for detecting and analyzing faults in a three phase feeder system having a first cable and one or more other cables. In accordance with the method, current magnitude in the first cable is determined. The current magnitude is compared to a threshold level. If the current magnitude exceeds the threshold level, a measure is made of how long the current magnitude stays above the threshold level. If the current magnitude stays above the threshold level for a duration that falls within a predetermined duration range, a timer is started. After the timer measures a predetermined time interval, a determination is made whether a fault is detected in the one or more other cables. If a fault is not detected in the one or more other cables, then a determination is made that a single phase fault has occurred in the feeder system.

Also provided in accordance with the present invention is a protective device operable to perform the foregoing method.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
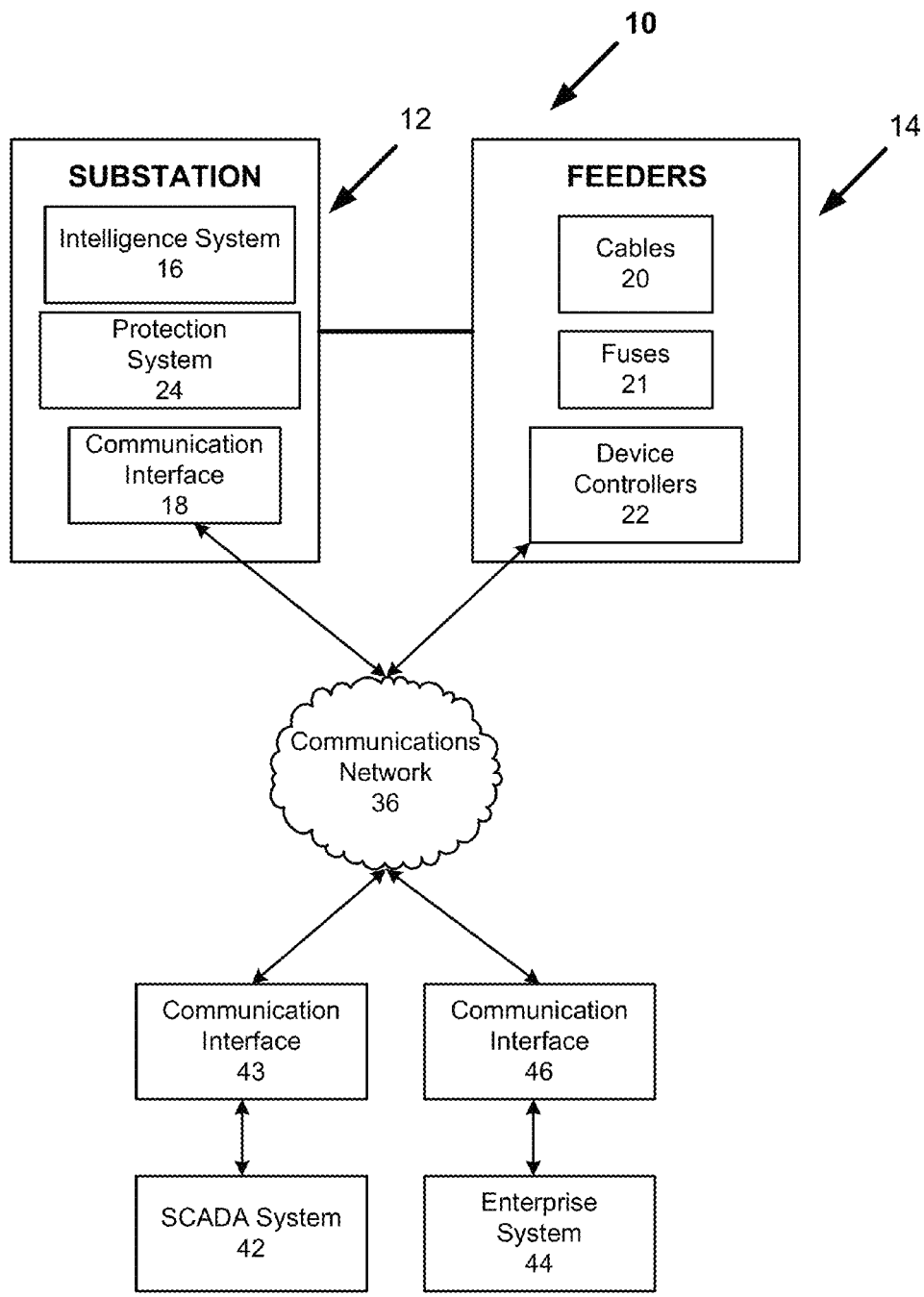
FIG. 1 shows a schematic of an electrical power distribution system along with control and monitoring systems.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown a power distribution system 10 that includes a substation 12 and one or more feeders 14 that convey power from the substation to customer premises. The substation 12 includes power transformers, high-voltage and low-voltage switchgear, circuit breakers, substation intelligent electronic devices (IEDs), a protection system 24, an intelligence system 16, and a communication interface 18. The feeders 14 include field devices, such as overhead/underground cables, distribution transformers, capacitors, reclosers, load-break switches, field IEDs, and other equipment and assets as are typically encountered in a power distribution system. In the present example shown in FIG. 1, the feeders 14 comprise cables 20, including primary and lateral cables, fuses 21 and device controllers 22 such as switch/recloser controllers.

The feeders 14 are operatively connected to the intelligence system 16. Depending on the architecture of a given system, the intelligence system 16 may function as one or more of a substation automation system, a feeder automation system, or a distribution automation system.

A supervisory control and data acquisition (SCADA) system 42 connects to the communications network 36 via suitable communications interface(s) 43. The SCADA system 42 is typically located remotely from the substation 12 and provides supervisory control functions for a plurality of substations and/or other components of the power distribution system.

The intelligence system 16 may also be connected to one or more enterprise computer systems 44, such as data warehouses, data marts, planning systems, geographic information systems (GIS), or centralized maintenance management systems (CMMS), which are likewise connected to the communications network 36 through communication interface(s) 46.

As noted above, the cables 20 include one or more feeder cables. Feeder cables are used to provide an electrical connection between the output of a substation and the input of downstream primary circuits. Feeder cables which leave the substation 12 are sometimes termed substation exit cables. Depending on siting and other considerations, some or all of the cable 20 may be installed underground, and, thus are underground cables.

The protection system 24 typically include one or more protective relays and associated circuit breakers or reclosers. The protective relays are advantageously implemented as IED-based devices which, among other functions, monitor the voltage, current, and other relevant parameters of their associated cables 20, for example to detect various fault conditions, such as those caused by current, voltage, and/or frequency disturbances and which may or may not be caused by a feeder fault including a cable fault.

Figure 2:
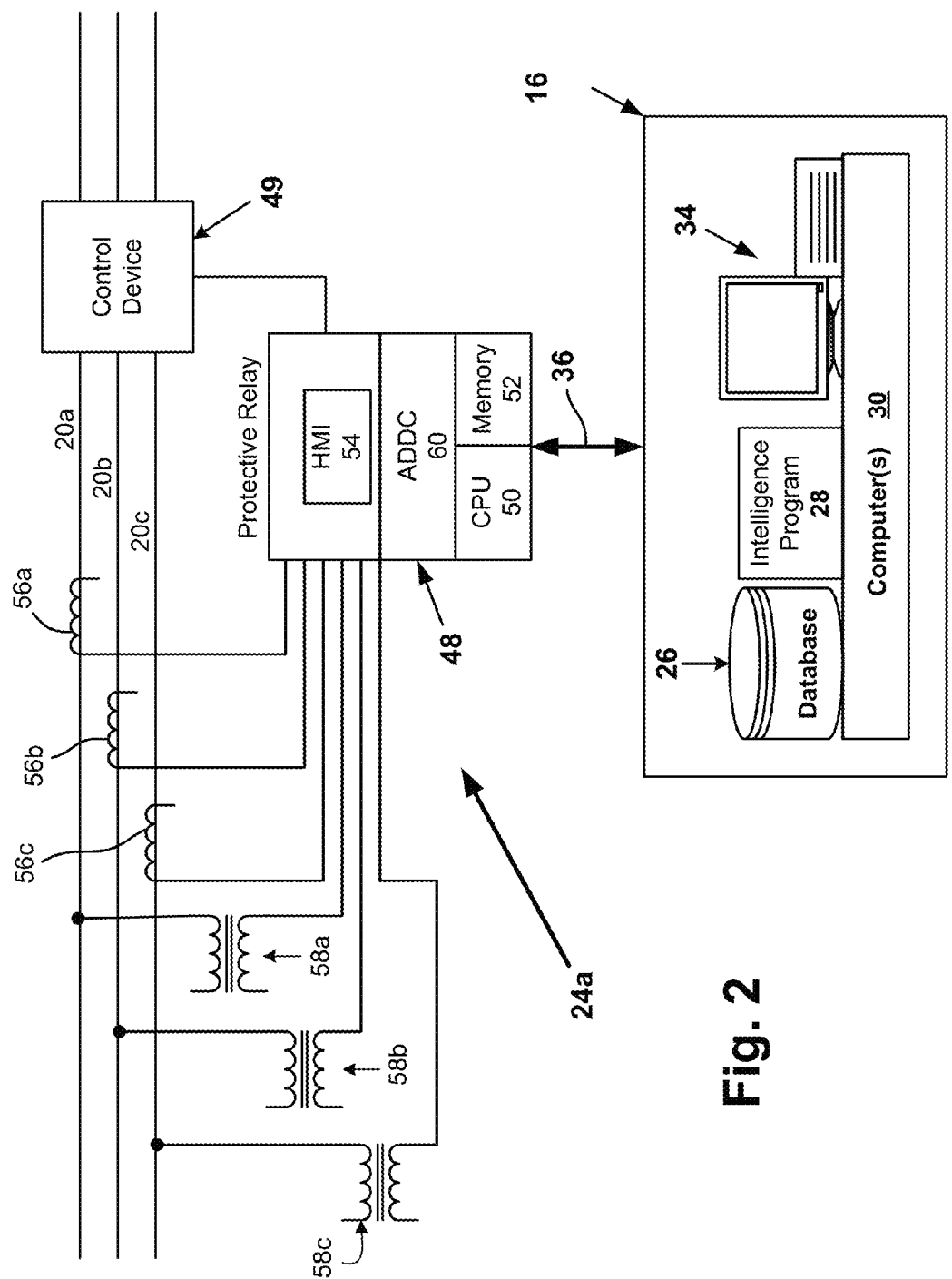
FIG. 2 shows a schematic of a substation intelligence system connected to a protection system.

As shown in FIG. 2, the intelligence system 16 includes a database 26 and an intelligence program 28 running on one or more computers 30, and a human machine interface (HMI) 34. The communication interface 18 connects the intelligence system 16 to a communications network 36 that may include a local area network (LAN), the internet, or other communication network. The intelligence system 16 may communicate with device controllers 22 over the communications network 36 using the DNP3 protocol, PPP protocol, the MODBUS protocol, or the TCP/IP protocol.

With particular reference to FIG. 2, there is shown a protection system 24a that comprises a protective relay 48 and an associated control device 49, such as a recloser or a circuit breaker. The protection system 24a is located in the substation as shown in FIG. 1. Alternately, the protection system 24a may be located remotely (e.g. more than about a quarter mile) from the intelligence system 16. The protective relay 48 is an IED and includes a microprocessor or central processing unit (CPU) 50, memory 52, and a human machine interface (HMI) 54, which may include a display screen and a user input device, such as a key pad. The protective relay 48 is connected to current transformers 56a,b,c and voltage transformers 58a,b,c that measure currents and voltages, respectively, in three cables 20a,b,c carrying three phases of power, respectively. The protective relay 48 is connected and provides control signals to the control device 49. The protective relay 48 is also connected to the intelligence system 16 through the communications network 36 and the communication interface 18. The protective relay 48 has a plurality of instantaneous, definite-time delay, and inverse-time delay overcurrent elements (phase, neutral, ground/sensitive ground and negative sequence).

An anomaly detection and data capture (ADDC) program 60 is stored in memory 52 and is executed by the CPU 50. The ADDC program 60 receives user input through the HMI 54. The ADDC program 60 monitors the currents and voltages in the cables 20 measured by the current transformers 56 and the voltage transformers 58, respectively. The ADDC program 60 also monitors the operation of the control device 49 and may monitor information received by the protective relay 48 from other field devices, including other current and voltage transformers and other protective relays. The ADDC program 60 is operable to detect faults or anomalies based on user selectable criteria that may be input into the ADDC program 60 through the HMI 54. In one embodiment of the present invention, the ADDC program 60 is operable to detect three different types of anomalies: overcurrent bursts, voltage deviations, and overcurrent element trips.

The ADDC program 60 detects overcurrent "bursts" that last less than a programmable time threshold setting (in milliseconds or cycles). For example, a user may set the threshold to be about one cycle (about 16 milliseconds). The ADDC program 60 may detect an overcurrent burst using a selected overcurrent protection element pickup of the protective relay 48, which itself has programmable settings. A user may select a particular overcurrent protection element through the HMI 54. For example, the ADDC program 60 may select an instantaneous ground time overcurrent protection element of the protective relay 48 for use in detecting an overcurrent burst. When such an overcurrent protection element is used, the threshold is set to a programmable percentage (e.g. 50%) of the selected overcurrent protection element pickup setting.

The ADDC program 60 detects voltage deviations greater than a programmable percentage threshold (e.g., 10%) of the nominal voltage setting that lasts longer than a programmable time threshold setting (in cycles). The percentage threshold and the time threshold may be set by a user through the HMI 54.

The ADDC program 60 detects any trip of any of one or more of the overcurrent protection elements.

Upon detecting an anomaly, such as an overcurrent burst, the ADDC program 60 captures digital fault record (DFR) data such as voltage, current, and other oscillographic data for a programmable collection period of time and sets a DFR flag indicating the occurrence of an anomaly. Typically, the ADDC program 60 takes voltage and/or current samples at a rate of 32 or more samples per cycle (about 16 milliseconds). The DFR data is formatted for transmission in the known common format for transient data exchange (COMTRADE) or other suitable file format and is then transmitted to the intelligence system 16 over the communications network 36. Depending on the nature and severity of the anomaly, the protective relay 48 may also trip the associated control device 49. The collection period during which DFR data is collected is set by a user through the HMI 54. The collection period may, by way of example, be greater than one cycle. For example, the collection period may be five, ten or fifteen cycles, or some other period.

A fault detection program 64 operates serially or in parallel with the ADDC program 60, depending on where the fault detection program 64 is installed and operates. In this regard, the fault detection program 64 may be stored in memory 52 and executed by the CPU 50 of the protective relay 48 or the fault detection program 64 may be stored in computer memory and executed by one or more of the computers 30 in the intelligence system 16. In the former case, the fault detection program 64 runs in parallel with the ADDC program 60 in real-time. In the latter case, the fault detection program 64 runs serially with the ADDC program 60 and operates on the DFR data transmitted by the ADDC program 60 to the intelligence system 16. The fault detection program 64 receives user input through the HMI 54 or the HMI 34, depending on where the fault detection program 64 is located.

Still another possibility is that the fault detection program 64 is stored in and executed by an IED that is separate from, but in communication with, the protective relay 48. Such an IED may be located in the substation 12 or may be located remotely from the substation 12. Such an IED may also be in communication with Intelligence system 16 or Protection system 24.

Figure 3:
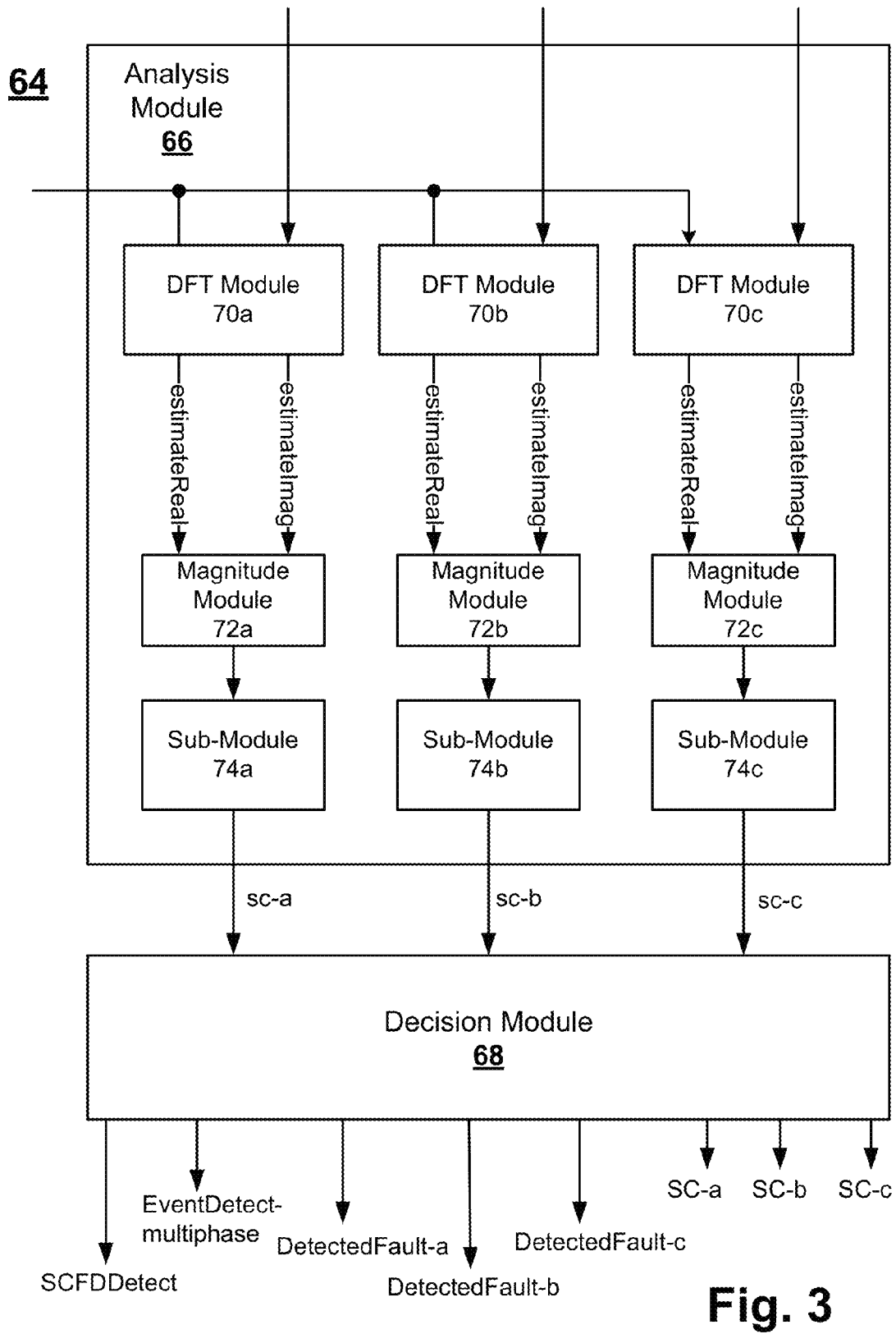
FIG. 3 shows a schematic of a fault detection program that is stored and executed in a protective relay of the protective system.

Generally, the fault detection program 64 includes an analysis module 66 and a decision module 68, as shown in FIG. 3.

The analysis module 66 includes three discrete Fourier transform (DFT) modules 70a,b,c, one for each phase of the power carried by the cables 20a,b,c. Each DFT module 70 receives current samples measured by the current transformer 56 associated with the DFT module 70. If the fault detection program 64 is located in the intelligence system 16, the current samples are obtained from the DFR data. Every fourth sample, the DFT module 70 has an interrupt wherein the preceding three samples and the fourth sample are stored in a ring buffer having a capacity to store the most recent sixteen current samples. At every interrupt, the DFT module 70 calculates a half cycle DFT using the last four current samples plus the preceding twelve current samples stored in the ring buffer. A half cycle is about 8 ms for 60 Hz power. The DFT module 70 has two outputs, estimateReal and estimateImag, corresponding to the real and imaginary parts of the DFT, respectively.

Each DFT module 70 is connected to a magnitude module 72 that receives the outputs of the DFT module 70 and uses them to calculate the magnitude of the current at the fundamental frequency of the power (e.g., 60 Hz), which shall hereinafter be referred to as the DFT magnitude. The DFT magnitude is stored in an array buffer and transmitted to a sub-module 74, which monitors the DFT magnitude.

Each sub-module 74 has an event counter and a fault counter. At each interrupt, if the DFT magnitude exceeds a maximum current level, the event counter is incremented by one. The event counter continues to be incremented until the current magnitude falls below the maximum current level, at which time the counter is reset. When the current magnitude does fall below the predetermined current level, the sub-module 74 determines whether a fault has occurred. If the counter number falls within a range determined by a lower level and an upper level, then the sub-module 74 determines that a fault has occurred. In one embodiment, the lower level is two (a quarter cycle) and the upper level is forty (5 cycles). The lower level and the upper level may be changed by a user through the HMI 34 or 54. If the sub-module 74 determines that a fault has occurred, the sub-module 74 increments a fault counter, which counts the number of times a fault has occurred. The values, sc-a, sc-b and sc-c, of the fault counters in the sub-modules 74a,b,c, are output to the decision module 68.

In each sub-module 74, the maximum current level that is used to determine whether a fault has occurred, is determined based on whether the sub-module 74 is operating in a fixed mode or an adaptive mode, the selection of which may be made by a user through the HMI 34 or 54.

In the fixed mode, the maximum current level is set equal to a fixed or preset threshold value that is input (selected) by a user through the HMI 34 or 54.

In the adaptive mode, the maximum current level is set equal to an adaptive threshold, which is either a multiple of the average value of the DFT magnitude (for the phase associated with the sub-module 74) over a predetermined number of previous power cycles, or, if there is a boundary condition, a fixed minimum value. A boundary condition may exist when the cables 20 just begin to start carrying current, such as in the case of a load pickup or other current inrush situation. The fixed minimum value is input by a user through the HMI 34 or 54 and may correspond to, or be equal to, the absolute minimum loading of the feeder of which the cables 20 are a part. The predetermined number of previous cycles used to calculate the average DFT magnitude may be two, three, four, or five or more previous cycles. In one embodiment of the invention, the predetermined number is three. The multiple used to calculate the maximum current level from the average DFT magnitude may be in a range from 1.5 to 3, more particularly from 1.5 to 2.5, still more particularly two (times).

The decision module 68 receives the values sc-a, sc-b and sc-c of the counters in the sub-modules 74a,b,c. If the decision module 68 detects a change in value in one of sc-a, sc-b and sc-c from the last interrupt, the decision module 68 determines that a fault has just occurred in the phase corresponding to the changed value and raises an output SCFDDetect to be high (a boolean one). In addition, a timer is started. After the timer measures a predetermined time period (which may about one cycle or 16 ms), the decision module 68 determines whether faults in the other two phases have occurred during that predetermined time period (as determined by the relevant sub-modules 74). In other words, the decision module 68 determines whether there are changes in the values of the other two of sc-a, sc-b and sc-c. If faults have occurred in one or both of the other two phases, the decision module 68 determines that the fault is a multiphase-fault and not a single phase fault. The decision module 68 then raises an output EventDetect-multiphase to be high. If, however, faults have not occurred in either of the other two phases, then the decision module 68 determines that the fault is a single phase fault. The decision module 68 then raises an output DetectedFault-(a, b or c) for the cable 20 for the phase in which the fault is detected. In addition, the decision module 68 increments a fault counter for the phase (cable 20) that keeps a running count of the number of times a single phase fault is detected in the phase (cable 20). The counts in the counters are output as SC-a, SC-b, SC-c.

Figure 4:
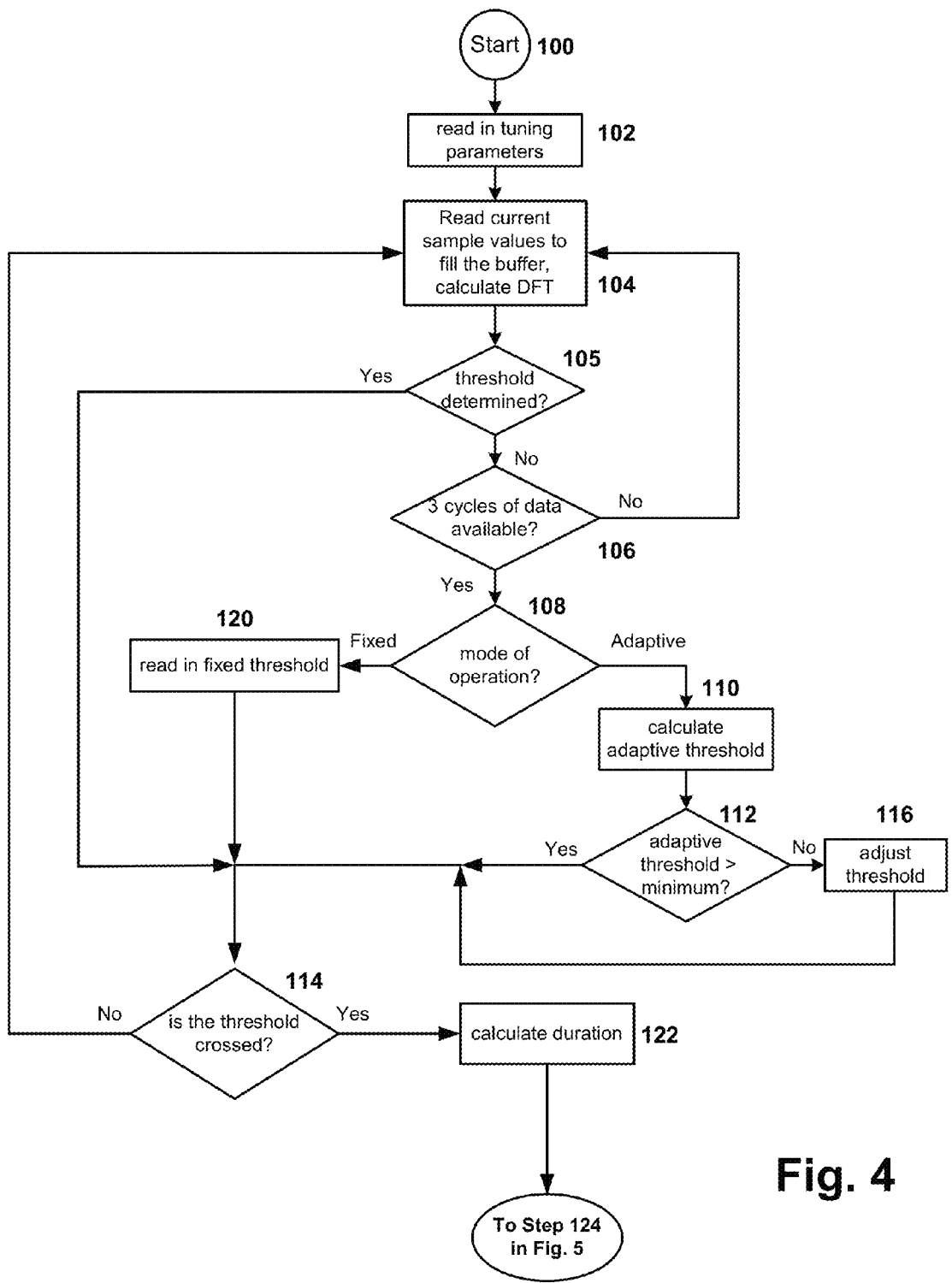
FIG. 4 shows a first portion of a flow chart of the operation of the fault detection program.
Figure 5:
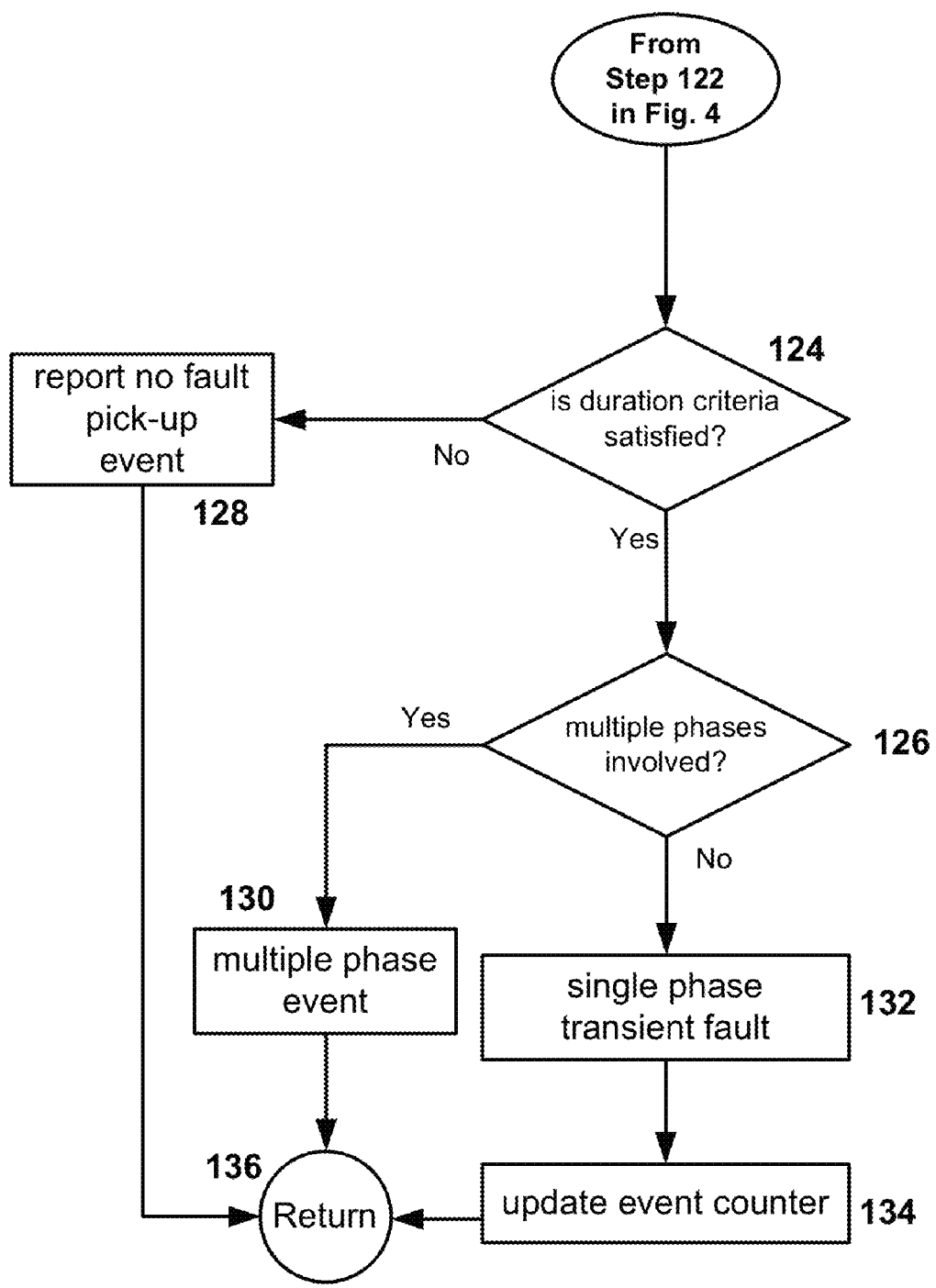
FIG. 5 shows a second portion of the flow chart.

Referring now to FIGS. 4 and 5, there is shown a flowchart of the fault detection program 64. In step 100, the program 64 starts. In step 102, the tunable parameters entered by a user through the HMI 34 or 54 (such as the whether the sub-module 74 is operating in the fixed mode or the adaptive mode) are read into the program 64. In step 104, ring buffer is filled with current sample values and their DFT is calculated for each phase. If, in step 105, it is determined that the threshold is already determined (as fixed or calculated), the program 64 proceeds to step 114. Otherwise, it proceeds to step 106, where a determination is made whether three cycles of data are available. If three cycles of data are available, the program 64 proceeds to step 108, whereas if three cycles of data are not available, the program 64 goes back to step 104 to compute more DFT magnitude values to the ring buffer. In step 108, a determination is made as to which mode of operation has been selected for the sub-module 74. If it is determined that the adaptive mode has been selected, the program 64 proceeds to step 110, wherein the adaptive threshold is calculated. In step 112, a determination is made whether the adaptive threshold is greater than the fixed minimum value, and if so, the program 64 proceeds to step 114. If the adaptive threshold is not greater than the fixed minimum value, then the adapted threshold is adjusted in step 116 so as to have a value greater than or equal to the fixed minimum value. From step 116, the program 64 proceeds to step 114. If, in step 108, it is determined that the fixed mode has been selected, the program proceeds to step 120, wherein the value of the fixed threshold is read into the program 64. In step 114, a determination is made whether the half cycle DFT magnitude exceeds the threshold (adapted or fixed). If the half cycle DFT does exceed the threshold, then the time it does so (its duration) is measured in step 122. If the half cycle DFT does not exceed the threshold, then the program 64 returns to step 102. From step 122, the program 64 proceeds to step 124, wherein a determination is made whether the duration criterion has been satisfied. If the duration criterion has not been satisfied, the program 64 first proceeds to step 128, wherein the non-fault pick-up event is reported, and then continues to return step 136. If the duration criterion has been satisfied, the program 64 proceeds to step 126 and a determination is made whether multiple phases are involved. If multiple phases are not involved, then the event is determined to be a single phase fault and is reported as such in step 132. The program 64 then proceeds to step 134, wherein the fault counter in the decision module 68 for the relevant phase (cable) is updated (incremented by one). If, in step 126, it is determined that multiple phases are involved, then the event is determined to be a multiple-phase fault and is reported as such in step 130. From step 130 or step 134, the program 64 proceeds to the return step 136, which causes the program 64 to return to step 100.

If the program 64 is located in the protective relay 48, the outputs from the decision module 68 (e.g., EventDetect-multiphase, DetectedFault-(a, b,c) and SC-a, SC-b and SC-c) are transmitted to the intelligence system 16 at the substation 12 over the communication network 36. In the intelligence system 16, the received data may time-stamped with the time and date of receipt and then may be stored in the database 26.

If the program 64 is located in the intelligence system 16, the program 64 directly interfaces with, or forms a part of the intelligence program 28.

The outputs from the decision module 68 are analyzed by the intelligence program 28 to determine the nature of the newly detected single phase fault. In this regard, it has been determined that a detected single phase fault can be attributable to: a self-clearing fault in one of the cables 20a,b,c, a blown fuse 21 in the feeder 14, or the operation of a fault-interrupting device such as a recloser by a device controller 22 (IED) located remotely from the substation 12. If (within a predetermined period of time from the detection of the single phase fault) the intelligence program 28 receives notification over the communication network 36 that a power outage has been reported by one or more customers or revenue meters but has not received any notification that a remote device controller 22 has actuated a recloser or switch, the intelligence program 28 will determine that the newly detected single phase fault is attributable to a blown fuse 21. If (within a predetermined period of time from the detection of the single phase fault) the intelligence program 28 receives notification over the communication network 36 that a remote device controller 22 has actuated a fault-interrupting device such as a recloser, the intelligence program 28 will determine that the newly detected single phase fault is attributable to the operation of the remote device controller 22. If (within a predetermined period of time from the detection of the single phase fault) the intelligence program 28 does not receive any notification of a power outage or operation of a remote device controller 22, the intelligence program 28 will determine that the newly detected single phase fault is attributable to a self-clearing fault in one of the cables 20a,b,c. The detection of a single phase fault by program 64, as well as the subsequent analysis and required operator notification performed by the intelligence program 28 occurs in real time or near real time, regardless whether the program is located in the protective relay 48, in the intelligence system 16, or in another IED.

If a single phase fault is determined to be a self-clearing fault, the intelligence program 28 will determine whether the self-clearing fault causes an alarm threshold to be exceeded. Such a determination may take into consideration the frequency of self-clearing faults in the cable 20, current and historical weather conditions recorded at the substation 12, and current and historical loading of the cable 20. In this regard, the inventors installed a data collection system in a typical distribution substation in order to capture and collect voltage and current oscillographic data from an underground distribution feeder at the substation level. The collected data was analyzed to determine characteristics of a class of incipient cable faults commonly referred to as self-clearing faults. These characteristics may be used as symptoms to confirm the re-occurring nature of the fault and determine the alarm thresholds used by the intelligence program 28 to notify operators and maintenance personnel.

The data collection system was similar to that shown and described above. Data was collected over a period of 10 months, during which time a total number of 141 incipient cable fault events were recorded before a catastrophic failure occurred that blew a 65 A fuse. Between the first incident and the catastrophic failure, there were similar cases of incipient faults with current spikes varying between 1000 A and 3000 A in magnitude with both positive and negative polarity. None of these events left a trace in the outage data nor led to any customer interruption.

Time domain and frequency domain analyses of the collected data were performed. The time domain analysis included calculation of the instantaneous peak fault current magnitude for each event, and calculation of rms load current by taking the average of the rms current in the first two cycles of the event window. The instantaneous peak fault current magnitude was then compared against the rms load current, and a correlation between these two data values was also performed. Another time domain value calculated was the duration of the incipient failure.

The frequency domain analysis was performed by applying the Fast Fourier

Transform (FFT) on the faulted current cycle. This provided a view of the harmonics present in the faulted cycle in the event window of interest. The primary reason to calculate the harmonics was to investigate the dominant harmonic among all the harmonics, and also to compare between the magnitudes of even and odd harmonics. The dominant harmonic may be used as a symptom parameter for performing predictive maintenance.

Figure 6:
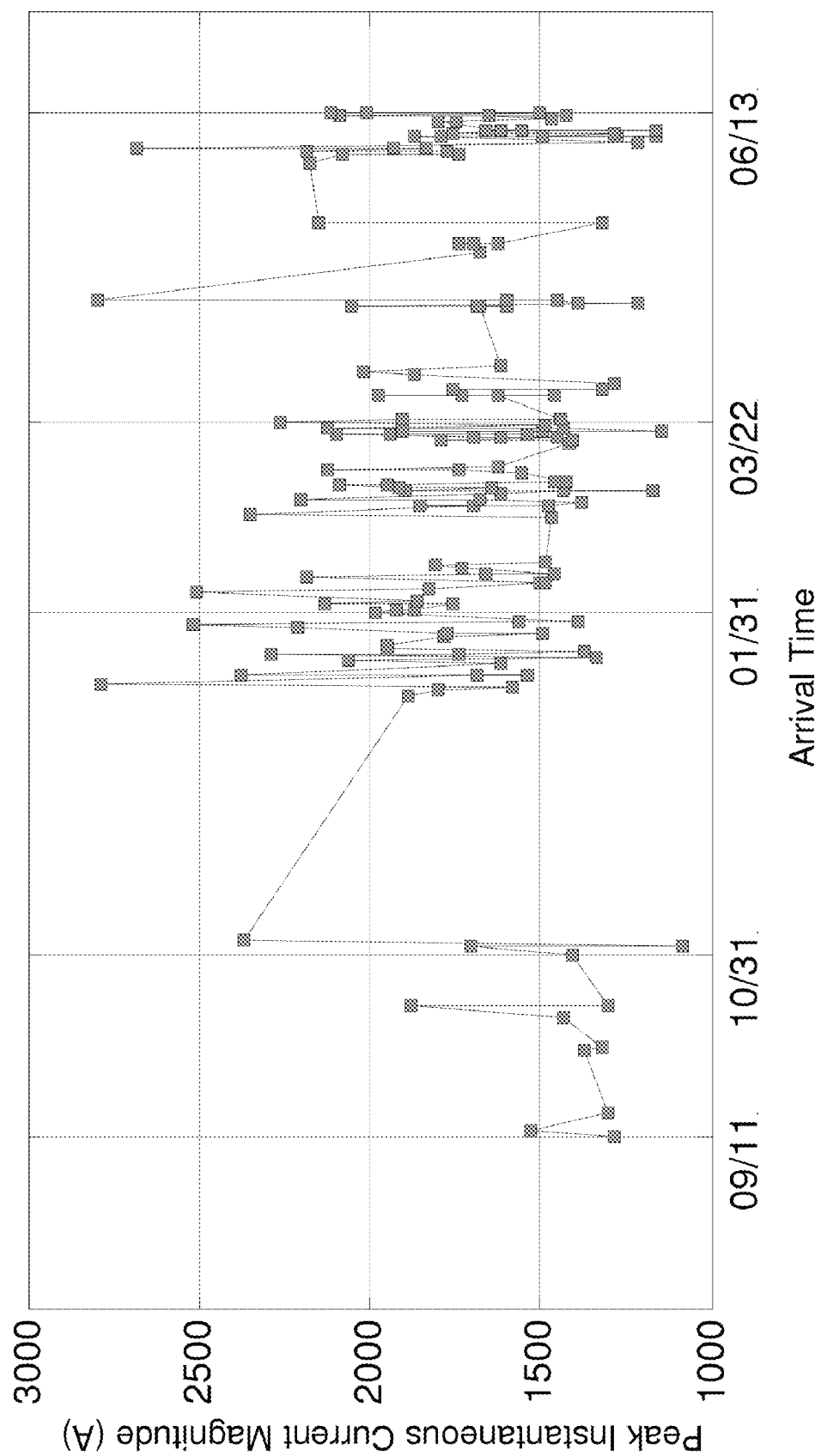
FIG. 6 shows a plot of absolute values of instantaneous peak currents for incipient faults in a monitored period.

FIG. 6 shows a plot of absolute values of instantaneous peak currents for incipient faults in the monitored period. As shown, the absolute peak of the incipient faults had a global maximum value of 2798 A, a global minimum value of 1087 A and an average value of 1720 A. There were 83 negative peaks and 63 positive peaks with a global maximum value for the positive and negative peaks being almost the same, 2798 A for the positive and 2781 A for the negative peaks. This indicates that the polarity is not a significant determining factor for fault initiation.

Figure 7:
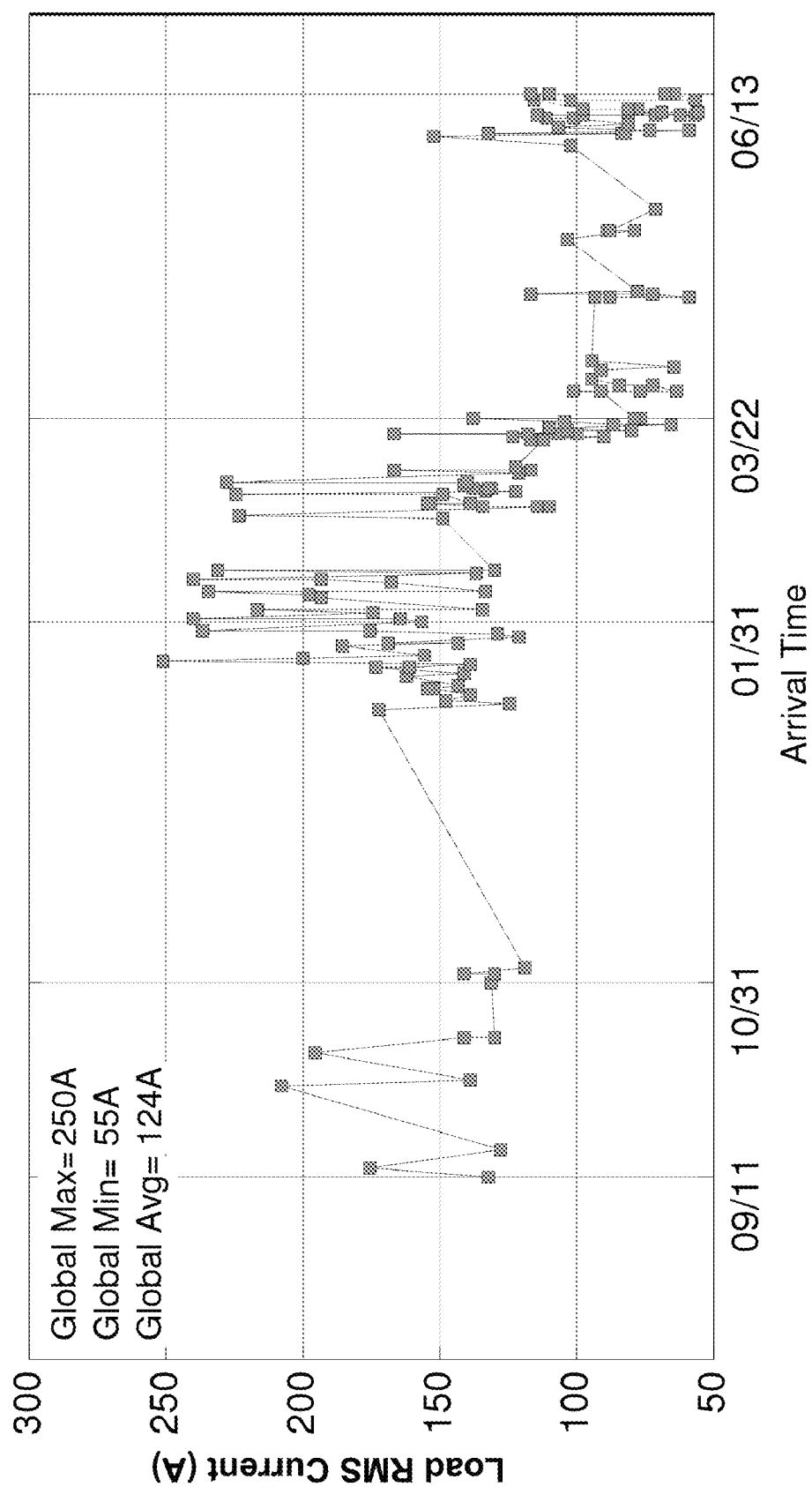
FIG. 7 shows a plot of rms load currents for incipient faults in the monitored period.

The rms load current was calculated by taking the average values over the first two cycles. This rms value takes into account all the harmonics and is the true rms value of the load current. A plot of rms load currents for incipient faults in the monitored period is shown in FIG. 7. Looking at the plots in FIGS. 6 and 7, it is evident that the instantaneous peak fault current values are quite high, at least five times the rms load current.

Figure 8:
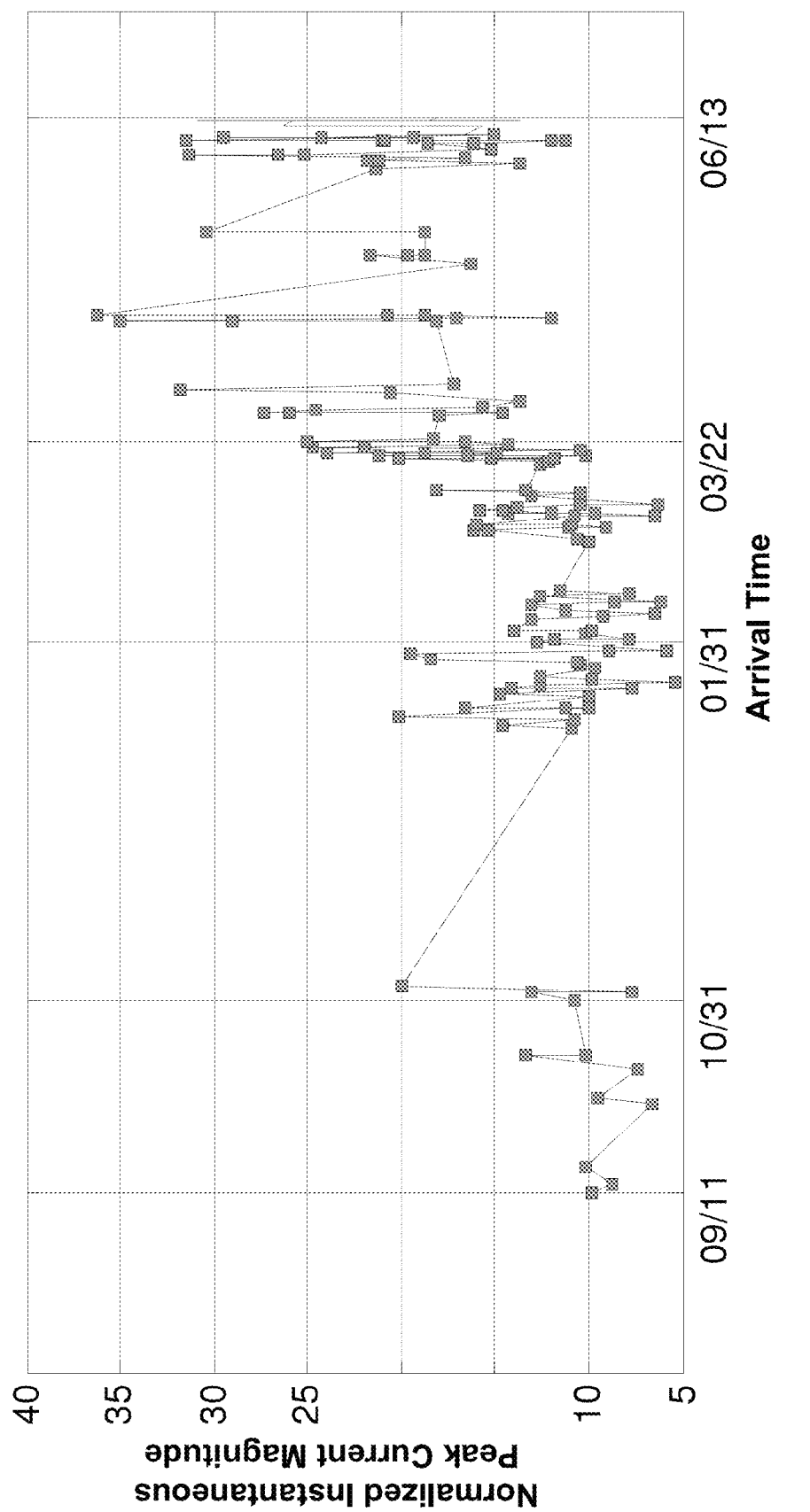
FIG. 8 shows a plot of absolute values of instantaneous peak fault currents normalized with respect to the rms load current for incipient faults in the monitored period.

A cross correlation function was calculated between the instantaneous peak fault current and the rms load current. This function was found to peak at the index value of 146, which is equal to the number of events recorded (141 faults, five of which were double spikes). This implies that the two data series are correlated with a lag factor of zero. Therefore, a normalization of the instantaneous peak fault current with respect to the rms load current was performed. A plot (shown in FIG. 8) was made of the absolute values of the instantaneous peak fault currents normalized with respect to the rms load current for incipient faults in the data collection period. This plot shows that there is a gradual increase in the normalized peak current values. The normalized peak increases to almost 3 times its initial value by the end of the monitoring period. This observation indicates that the cable splice integrity was being degraded further with every instance of a reoccurring incipient fault and arcing.

The odd ($3^{rd}$, $5^{th}$, $7^{th}$ and $9^{th}$) and even ($0^{th}$, $2^{nd}$, $4^{th}$, $6^{th}$ and $8^{th}$) current harmonics were normalized with respect to the fundamental current over the faulted cycle. From this normalization, it was evident that the second harmonic was almost 70% of the fundamental and the dominant harmonic. In addition, the even harmonics were relatively higher as compared to the odd harmonics. One of the major reasons for these observations is that the FFT was performed on the cycle containing the fault current spike.

The dominant current harmonics ($0^{th}$, $2^{nd}$ and $3^{rd}$) and the fundamental component were normalized with respect to the rms load current of FIG. 7. These current harmonics were dominant in the fault cycle as was observed earlier and feature an increasing trend similar to the normalized peak current in FIG. 8. They seem to be positively correlated with the failure and even though they are not unique to these failures, they may be used as symptom parameters for predictive maintenance.

In sum, the inventors observed that faults typically occur when voltage stress is at a peak; the instantaneous peak fault current can reach high values, such as five times the rms load current; the duration of the fault is typically less than a half cycle; cable splice integrity is degraded further with every instance of a reoccurring incipient fault and arcing; the time between successive events or inter-arrival times show idle periods of varying magnitudes and duration, thereby illustrating the intermittent and on/off behavior of these types of faults; and the dominant current harmonics were found to be $0^{th}$, $2^{nd}$ and $3^{rd}$ in the fault cycle, featuring an increasing trend similar to that of the normalized peak current.

As stated above, the foregoing information may be used to determine the alarm thresholds used by the intelligence program 28 to notify operators and maintenance personnel. For example, an alarm may be generated for a fault (occurring after one or more previous faults) if the absolute value of the instantaneous peak fault current normalized with respect to the rms load current exceeds two or two-and-a-half times its value at an initial one of the previous fault(s). This alarm may indicate that a catastrophic cable fault is imminent and corrective action needs to promptly be taken.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims. For example, various different Fourier transform algorithms are contemplated for use in the analysis module 66. According to one such alternative, the discrete Fourier transform may be implemented using a suitable fast Fourier transform (FFT) algorithm.

What is claimed is:

1. A method of detecting and analyzing faults in a three phase feeder system having a first cable and one or more other cables, the method being performed by at least one computer and comprising:

receiving a mode selection from a user through a user interface;

determining current magnitude in the first cable;

comparing the current magnitude to a threshold level;

when the current magnitude exceeds the threshold level, starting a counter of the at least one computer;

when the current magnitude falls below the threshold level, stopping the counter and determining from the counter how long the current magnitude stayed above the threshold level;

when the current magnitude is determined to have stayed above the threshold level for a duration that falls within a predetermined duration range having lower and upper levels, starting a timer;

after the timer measures a predetermined time interval, determining whether a fault is detected in the one or more other cables during the predetermined time interval; and when a fault is not detected in the one or more other cables, determining that a single phase fault has occurred in the feeder system;

wherein when the mode selection is an adaptive mode, the threshold level is the greater of a fixed minimum value and an adaptive value calculated from prior current magnitudes, and wherein when the mode selection is a fixed mode, the threshold level is a preset value received from a user through the user interface.

2. The method of claim 1, wherein when a fault is detected in the one or more other cables, determining that a multiphase fault has occurred in the cables.

3. The method of claim 1, wherein the current magnitude is determined at a nominal frequency of the power.

4. The method of claim 3, wherein the current magnitude is determined by performing a half-cycle Fourier transform of current measurements in a moving window from the first cable.

5. The method of claim 4, further comprising receiving digital fault record data from a remotely located protective relay, the digital fault record data including the current measurements from the first cable.

6. The method of claim 1, wherein the adaptive value is a multiple of the average value of prior current magnitudes over more than one prior power frequency cycle.

7. The method of claim 1, wherein the lower level of the predetermined duration range is about a quarter cycle of a nominal frequency of the power and the upper level of the predetermined duration range is about five cycles of the nominal frequency.

8. The method of claim 7, wherein the predetermined time interval is about one cycle of the nominal frequency.

9. The method of claim 1, wherein the step of determining whether a fault is detected in the one or more other cables comprises for each other cable:

determining current magnitude in the other cable;

comparing the current magnitude in the other cable to another threshold level;

when the current magnitude in the other cable exceeds the other threshold level, measuring how long the current magnitude stays above the other threshold level; and when the current magnitude stays above the other threshold level for a duration that falls within another predetermined duration range, determining that a fault has occurred.

10. A protective device for monitoring power conveyed by a first cable and one or more other cables, the protective device comprising a processor and memory storing a fault detection program, which when executed by the processor, performs a method of detecting and analyzing faults in a three phase feeder system having a first cable and one or more other cables, the method comprising:

receiving a mode selection from a user through a user interface;

determining current magnitude in the first cable;

comparing the current magnitude to a threshold level;

when the current magnitude exceeds the threshold level, starting a counter;

when the current magnitude falls below the threshold level, stopping the counter and determining from the counter how long the current magnitude stayed above the threshold level;

when the current magnitude is determined to have stayed above the threshold level for a duration that falls within a predetermined duration range having lower and upper levels, starting a timer;

after the timer measures a predetermined time interval, determining whether a fault is detected in the one or more other cables during the predetermined time interval; and when a fault is not detected in the one or more other cables, determining that a single phase fault has occurred in the feeder system;

wherein when the mode selection is an adaptive mode, the threshold level is the greater of a fixed minimum value and an adaptive value calculated from prior current magnitudes; and wherein when the mode selection is a fixed mode, the threshold level is a preset value received from a user through the user interface.

11. The protective device of claim 10, wherein the current magnitude is determined by performing a Fourier transform of current measurements from the first cable.

12. The protective device of claim 10, wherein the protective device further comprises a user interface, and wherein the threshold level is a preset value that is received from a user through a user interface.

13. The protective device of claim 10, wherein the lower level of the predetermined duration range is about a quarter cycle of a nominal frequency of the power and the upper level of the predetermined duration range is about five cycles of the nominal frequency.

14. The protective device of claim 13, wherein the predetermined time interval is about one cycle of the nominal frequency.

15. The protective device of claim 14, wherein the protective device comprises a protective relay.

* * * * *